United States Patent [19]
Bruderer et al.

[11] 3,887,548
[45] June 3, 1975

[54] PYRAZOLE DERIVATIVES

[75] Inventors: Hans Bruderer, Benken; Rolf Richle, Mohlin; Rudolf Ruegg, Bottmingen, all of Switzerland

[73] Assignee: Hoffmann-La Roche Inc., Nutley, N.J.

[22] Filed: Apr. 8, 1974

[21] Appl. No.: 459,149

Related U.S. Application Data

[62] Division of Ser. No. 296,691, Oct. 11, 1972, Pat. No. 3,822,283.

[30] Foreign Application Priority Data

Oct. 22, 1971 Switzerland.................. 15404/71
Sept. 12, 1972 Switzerland.................. 13327/72

[52] U.S. Cl....... 260/240 A; 260/240 J; 260/240 G; 260/295 R; 260/295.5 R; 260/307 G; 260/310 R; 424/263; 424/266; 424/272; 424/273
[51] Int. Cl....................... C07d 85/52; C07d 49/18
[58] Field of Search......... 260/240 J, 310 R, 240 A, 260/240 G, 307 G

[56] References Cited
UNITED STATES PATENTS

| | | | |
|---|---|---|---|
| 3,304,303 | 2/1967 | Schmidt et al. | 260/240 A |
| 3,544,587 | 12/1970 | Swett et al. | 260/240 G |
| 3,760,082 | 9/1973 | Marsico et al. | 260/310 R |
| 3,760,083 | 9/1973 | Marsico et al. | 260/310 R |
| 3,833,605 | 9/1974 | Karadavidoff | 260/310 R |

OTHER PUBLICATIONS

Long et al., J. Hetero. Chem. 1 (1970) pp. 863–869.

*Primary Examiner*—Arthur P. Demers
*Attorney, Agent, or Firm*—Samuel L. Welt; Bernard S. Leon; William G. Isgro

[57] ABSTRACT

Substituted 4-nitropyrazole-5-carboxamidoximes and substituted 3-(4-nitropyrazol-5-yl)-4,5-dihydro-1,2,4-oxadiazoles, prepared, inter alia, from the correspondingly substituted 4-nitro-5-cyano-pyrazoles, are described. The end products of the invention possess psychosedative activity and are therefore useful as tranquilizing agents.

42 Claims, No Drawings

PYRAZOLE DERIVATIVES

Cross-Reference to Related Applications

This application is a division of U.S. Pat. Application Ser. No. 296,691, filed Oct. 11, 1972, now Pat. No. 3,822,283

BRIEF SUMMARY OF THE INVENTION

The pyrazole derivatives provided by the invention are characterized by the formula

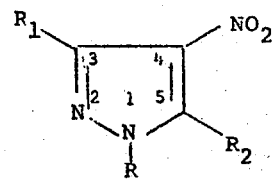  I wherein
R is lower alkenyl, lower alkyl or lower alkyl substituted with halogen, hydroxy, lower alkoxy, lower alkoxycarbonyl or carboxy; $R_1$ is hydrogen, halogen, lower alkyl or lower alkoxy and $R_2$ is a group of the formula

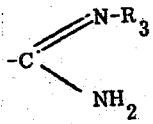 or 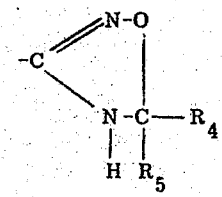

wherein
$R_3$ is hydroxy, lower alkanoyloxy, lower alkoxycarbonyloxy, lower alkoxy, lower alkoxy substituted with halogen or lower alkoxy, phenyl-carbonyloxy, phenyl-(lower alkylcarbonyloxy), phenyl-(lower alkenylcarbonyloxy), pyridyl-(lower alkylcarbonyloxy) or pyridylcarbonyloxy (the phenyl residues and the pyridyl residues being optionally substituted with lower alkyl, lower alkoxy or halogen); $R_4$ is lower alkyl or phenyl and $R_5$ is hydrogen or lower alkyl or $R_4$ and $R_5$ together with the carbon atom to which they are attached comprise a 5-, 6- or 7-membered alicyclic ring,
or pharmaceutically acceptable acid addition salts thereof. The compounds of formula I possess psychosedative activity and are therefore useful as tranquilizing agents.

DETAILED DESCRIPTION OF THE INVENTION

The pyrazole derivatives provided by the invention are characterized by the formula

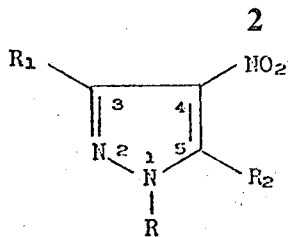  I wherein
R is lower alkyl, halo-lower alkyl, hydroxy-lower alkyl, lower alkoxy-lower alkyl, lower alkoxy-carbonyl-lower alkyl, carboxy-lower alkyl or lower alkenyl; $R_1$ is hydrogen, halogen, lower alkyl or lower alkoxy and $R_2$ is a radical of the formula

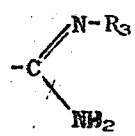 or 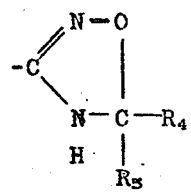

wherein
$R_3$ is hydroxy, lower alkanoyloxy, lower alkoxycarbonyloxy, lower alkoxy, halo-lower alkoxy, lower alkoxy-lower alkoxy, phenylcarbonyloxy, lower alkyl-phenylcarbonyloxy, lower alkoxy-phenylcarbonyloxy, halo-phenylcarbonyloxy, phenyl(lower alkylcarbonyloxy), lower alkylphenyl-(lower alkylcarbonyloxy), lower alkoxyphenyl-(lower alkylcarbonyloxy), halo-phenyl-(lower alkylcarbonyloxy), phenyl-(lower alkenylcarbonyloxy), lower alkyl-phenyl-(lower alkenylcarbonyloxy), lower alkoxy-phenyl-(lower alkenylcarbonyloxy), halo-phenyl-(lower alkenylcarbonyloxy), pyridyl-(lower alkylcarbonyloxy), lower alkyl-pyridyl-(lower alkylcarbonyloxy), lower alkoxy-pyridyl-(lower alkylcarbonyloxy), halo-pyridyl-(lower alkylcarbonyloxy), pyridylcarbonyloxy, lower alkyl-pyridylcarbonyloxy, lower alkoxy-pyridyl-carbonyloxy, or halo-pyridylcarbonyloxy; $R_4$ is lower alkyl or phenyl; and $R_5$ is hydrogen or lower alkyl, or $R_4$ and $R_5$, taken together with the carbon to which they are attached, are a 5-, 6- or 7-membered alicyclic ring, or pharmaceutically acceptable acid addition salts thereof.

The pyrazole derivatives of the invention, that is, the compounds of formula I and their pharmaceutically acceptable acid addition salts, can be prepared as follows:

(a) reacting a compound of the formula

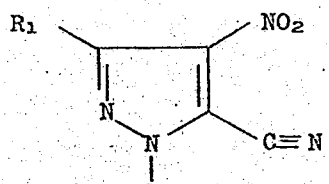

(II)

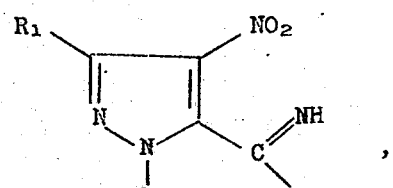

(III)

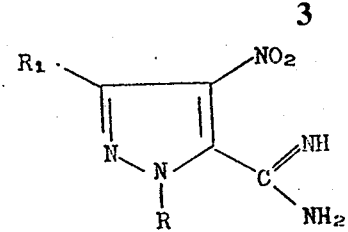 (IV)

or

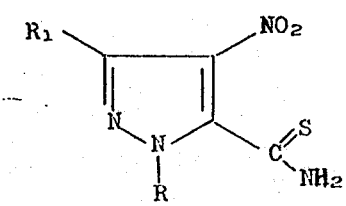 (V)

wherein
R and R₁ are as previously described, and R₆ is lower alkyl, with hydroxylamine to give an amidoxime of the formula

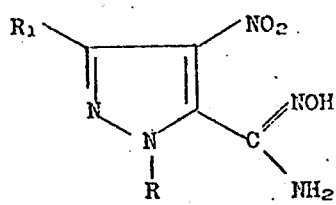 VI wherein
R and R₁ are as previously described; or
b. reacting an amidoxime of the formula VI with an alkylating agent, an appropriate acylating agent or a chloroformic acid lower alkyl ester; or
c. reacting an amidoxime of the formula VI with a carbonyl compound of the formula

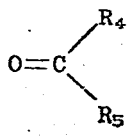 VII wherein
R₄ and R₅ are as previously described,
or an acetal thereof;
d. separating a racemate obtained into its optical antipodes, if desired; and
e. converting a compound obtained into a salt, if desired.

As used herein, the term "lower alkyl," alone or in combinations, such as "lower alkoxy," "lower alkoxycarbonyl," "phenyl-(lower alkylcarbonyloxy)," "lower alkoxycarbonyloxy" or "pyridyl-(lower alkylcarbonyloxy)," denotes a straight chain and branched chain hydrocarbon group having 1 to 5 carbon atoms, such as methyl, ethyl, propyl, isopropyl, butyl, tert-butyl, pentyl, and the like. The term "lower alkenyl" denotes a straight chain and branched chain unsaturated hydrocarbon group having 2 to 5 carbon atoms, such as allyl, propenyl, butenyl, pentenyl and 1,1-dimethylpropenyl. The "lower alkenyl" moiety of the "phenyl-(lower alkenylcarbonyloxy)" group is as described above. The term "alkanoyloxy" denotes a straight chain and branched chain aliphatic carboxylic acid residue having 1 to 5 carbon atoms, such as acetoxy, propionyloxy, butyryloxy and the like. The term "halogen" denotes fluorine, chlorine, bromine and iodine; preferred is chlorine. Exemplary of 5-, 6- and 7-membered alicyclic rings are cyclopentyl, cyclohexyl and cycloheptyl.

Preferred compounds of formula I are those in which R is lower alkyl and R₁ is hydrogen or lower alkyl. Other preferred compounds are those in which R₂ is a radical of the formula

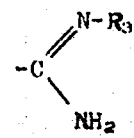

wherein
R₃ is as previously described, and particularly preferred are those in which R₃ is (lower alkoxy)-(lower alkoxy).

Another preferred group of compounds of formula I comprises those compounds in which R₂ is a radical of the formula

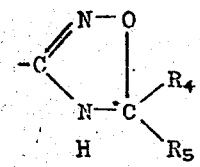

wherein
R₄ and R₅ are as previously described. Particularly preferred compounds of this group are those in which R₄ is lower alkyl, preferably methyl, or phenyl and R₅ is hydrogen or R₄ and R₅, independently, are lower alkyl, preferably methyl.

Exemplary of the compounds of formula I are:
1,3-dimethyl-4-nitropyrazole-5-carboxamidoxime;
3-methyl-4-nitro-1-propylpyrazole-5-carboxamidoxime;
1-methyl-4-nitropyrazole-5-carboxamidoxime;
1-(2-hydroxyethyl)-3-methyl-4-nitropyrazole-5-carboxamidoxime;
1,3,O-trimethyl-4-nitropyrazole-5-carboxamidoxime;
1-vinyl-3-methyl-4-nitropyrazole-5-carboxamidoxime;
O-ethyl-1,3-dimethyl-4-nitropyrazole-5-carboxamidoxime;
O-propyl-1,3-dimethyl-4-nitropyrazole-5-carboxamidoxime;
O-acetyl-1,3-dimethyl-4-nitropyrazole-5-carboxamidoxime;
O-propionyl-1,3-dimethyl-4-nitropyrazole-5-carboxamidoxime;
O-(3-chloropropionyl)-1,3-dimethyl-4-nitropyrazole-5-carboxamidoxime;
O-butyryl-1,3-dimethyl-4-nitropyrazole-5-carboxamidoxime;
O-benzoyl-1,3-dimethyl-4-nitropyrazole-5-carboxamidoxime;

O-(p-chlorobenzoyl)-1,3-dimethyl-4-nitropyrazole-5-carboxamidoxime;
O-(3,4,5-trimethoxybenzoyl)-1,3-dimethyl-4-nitropyrazole-5-carboxamidoxime;
O-nicotinoyl-1,3-dimethyl-4-nitropyrazole-5-carboxamidoxime;
O-isobutoxycarbonyl-1,3-dimethyl-4-nitropyrazole-5-carboxamidoxime;
O-isonicotinoyl-1-methyl-4-nitropyrazole-5-carboxamidoxime;
O-cinnamoyl-1,3-dimethyl-4-nitropyrazole-5-carboxamidoxime;
O-phenylacetyl-1,3-dimethyl-4-nitropyrazole-5-carboxamidoxime;
O-hydrocinnamoyl-1,3-dimethyl-4-nitropyrazole-5-carboxamidoxime;
O-cyclohexylcarbonyl-1,3-dimethyl-4-nitropyrazole-5-carboxamidoxime;
O-ethoxycarbonyl-1,3-dimethyl-4-nitropyrazole-5-carboxamidoxime;
O-ethoxycarbonyl-1-methyl-4-nitropyrazole-5-carboxamidoxime;
O-butoxycarbonyl-1,3-dimethyl-4-nitropyrazole-5-carboxamidoxime;
O-isopropoxycarbonyl-1,3-dimethyl-4-nitropyrazole-5-carboxamidoxime;
O-isobutoxycarbonyl-1,3-dimethyl-4-nitropyrazole-5-carboxamidoxime;
O-(2-bromoethoxy)carbonyl-1,3-dimethyl-4-nitropyrazole-5-carboxamidoxime;
O-allyloxycarbonyl-1,3-dimethyl-4-nitropyrazole-5-carboxamidoxime;
O-(1-methoxy-1-methylethyl)-1,3-dimethyl-4-nitropyrazole-5-carboxamidoxime;
3-(1,3-dimethyl-4-nitropyrazol-5-yl)-4,5-dihydro-5-methyl-1,2,4-oxadiazole;
3-(1,3-dimethyl-4-nitropyrazole-5-yl)-4,5-dihydro-5-propyl-1,2,4-oxadiazole;
3-(1,3-dimethyl-4-nitropyrazole-5-yl)-4,5-dihydro-5-phenyl-1,2,4-oxadiazole;
3-(1,3-dimethyl-4-nitropyrazol-5-yl)-1-oxa-2,4-diazaspiro-[4,5]dec-2-ene;
3-(1,3-dimethyl-4-nitropyrazol-5-yl)-4,5-dihydro-5,5-dimethyl-1,2,4-oxadiazole;
4,5-dihydro-5-methyl-3-(3-methyl-4-nitro-1-propylpyrazol-5-yl)-1,2,4-oxadiazole;
3-(1-methyl-4-nitropyrazol-5-yl)-4,5-dihydro-5-methyl-1,2,4-oxadiazole;
O-methoxymethyl-1,3-dimethyl-4-nitropyrazole-5-carboxamidoxime and the like.

In accordance with Step (a) of the process for preparing the compounds of formula I, the amidoximes of formula VI are prepared by reacting a compound of formula II, III, IV or V with hydroxylamine. This reaction is carried out in an inert solvent, for example, a lower alkanol, preferably methanol or ethanol, dimethylformamide, dimethylsulfoxide, a chlorinated hydrocarbon, preferably methylene chloride or chloroform, an ether such as dioxane or diethyl ether, a hydrocarbon such as benzene, or the like. The reaction is advantageously carried out at a temperature in the range of from about 0°C. to about the boiling point of the reaction mixture. It is particularly preferred to carry out the reaction at a temperature in the range of from about 40° to about 60°C. The pressure at which the reaction is carried out is not critical; the reaction is preferably carried out in an open vessel. Preferably, the reaction is carried out by the exclusion of water when a nitrile of formula II is used as the starting material because in the presence of water troublesome amounts of the corresponding amide are obtained as a result of side-reactions. The working-up of the reaction mixture is carried out in the unusual manner by removal of the solvent and recrystallization of the residue.

In accordance with an embodiment of Step (b) of the process of the invention, an amidoxime of the formula VI is reacted with an alkylating agent. Depending on the choice of the alkylating agent, there are obtained compounds of formula I wherein $R_3$ is lower alkoxy which may be substituted with halogen or lower alkoxy. Thus, for example, when methyl iodide is used as the alkylating agent there is obtained from the amidoxime a compound of formula I wherein $R_3$ is methoxy. An essential feature of this alkylating reaction is the prior conversion of the amidoxime starting material of formula VI into an alkali metal or alkaline earth metal salt. For this purpose, an amidoxime of formula VI is dissolved in a lower alkanol, preferably methanol or ethanol, and the mixture treated with an alkali metal or alkaline earth metal alcoholate, preferably sodium methylate or sodium ethylate. This salt formation can also be advantageously carried out in dimethylformamide with the addition of an alkali metal or alkaline earth metal hydride.

A salt prepared in this manner is reacted with the alkylating agent in an inert organic solvent, preferably in the same solvent which was used for the salt formation. As the alkylating agents there can be used, for example, alkyl halides -fluorides-alkylsulfonyloxy compounds, preferably mesyloxy compounds or arylsulfonyloxy compounds, preferably tosyloxy compounds. The reaction is advantageously carried out at a temperature in the range of about 0°C. to about the boiling point of the reaction mixture, preferably at the reflux temperature. When a special alkylating agent such as a (lower alkoxy)-(lower alkyl) halide, for example, methoxymethyl chloride, is used, it is desirable to carry out the reaction at a temperature below 0°C., preferably at a temperature in the range of about −30° to about −50°C. The pressure at which the reaction is carried out is not critical; thus, the reaction can be carried out in an open vessel.

In accordance with another embodiment of step (b) of the process of the invention, an amidoxime of formula VI is reacted with a suitable functional derivative of a carboxylic acid corresponding to the acyl group denoted by $R_3$ in formula I, for example, a lower alkanecarboxylic acid such as acetic acid, or a lower arylcarboxylic acid such as benzoic acid. Examples of suitable reactive functional derivatives of carboxylic acids which can be used for the acylation of an amidoxime of formula VI are anhydrides, for example, acetic anhydride, chloroacetic acid anhydride and the like, acid halides, for example, acetyl chloride, isonicotinoyl chloride hydrochloride, nicotinoyl chloride and the like, imidazolides, for example, picolinic acid imidazolide, methoxyacetic acid imidazolide, nicotinic acid imidazolide and the like, as well as other derivatives suitable as acylating agents.

The reaction conditions are not critical and can readily be selected by any person skilled in the art depending on the carboxylic acid derivative chosen as the acylating agent. For example, the reaction can be carried out at room temperature or at a temperature above or below room temperature, depending on the reagent chosen. In addition, it is expedient to carry out the reaction in a conventional inert organic solvent, for example, a hydrocarbon such as benzene, toluene and the like, a chlorinated hydrocarbon such as methylene chloride and the like, an ether such as tetrahydrofuran and the like, dimethylformamide, pyridine and the like.

In accordance with a further embodiment of Step (b) of the process of the invention, an amidoxime of formula VI is reacted with a chloroformic acid lower alkyl ester, conveniently in an inert organic solvent, for example, pyridine, an ether such as, preferably, dioxane or tetrahydrofuran, a chlorinated hydrocarbon such as chloroform or methylene chloride, or the like. Advantageously, this reaction is carried out at a temperature in the range of from about 0° to about 40°C., preferably from about 0°C. to about room temperature.

In accordance with Step (c) of the process of the invention, an amidoxime of formula VI is reacted with a carbonyl compound of formula VII or an acetal thereof. The reaction parameters such as solvent, temperature, reaction time and pressure can be varied in a manner which is known and obvious to a person skilled in the art. Thus, the reaction can be carried out in an inert organic solvent or in the absence of a solvent. It will be evident that when a solvent having a boiling point below the reaction temperature is used, the reaction is carried out in a closed system, for example, in an autoclave or a bomb-tube. If the boiling point of the solvent lies in the neighborhood of the reaction temperature, the reaction can be carried out under reflux conditions and, if it lies above the reaction temperature, heating to this temperature will be sufficient. Exemplary of suitable inert organic solvents are ethers such as diisopropyl ether and tetrahydrofuran, alcohols such as methanol and ethanol, hydrocarbons such as benzene and toluene, halogenated hydrocarbons such as chloroform and dichloroethylene, and highly polar solvents such as dimethylformamide.

The pressure at which the reaction is carried out is not a critical feature for this reaction and as mentioned earlier, it can be carried out in an open or closed system, that is, at normal pressure or at an elevated pressure.

A favorable temperature for the reaction of an amidoxime of formula VI with a carbonyl compound of formula VII or an acetal thereof is in the range of about 50° to about 150°C., preferably between about 90° and about 120°C. Temperatures below 20°C., however, are not desirable for technical purposes, namely, the rate of reaction is too slow.

Examples of acetals of the carbonyl compounds of formula VII which can be used in embodiment (c) hereinbefore are lower alkyl acetals, preferably diethyl acetal.

With particular regard to temperature, quite generally an upper limit is set, namely, one at which decomposition of the starting material and/or the reaction product occurs. This applies to all embodiments of the process described herein.

In accordance with process variant (d), the optically active antipodes of the compounds of formula I can be obtained from the corresponding racemate. The separation or resolution is carried out according to known methods, that is, by reacting the recemate with a suitable optically active acid, separation of the two diastereoisomeric salts obtained, for example, by fractional crystallization, and subsequent liberation of the optically uniform base.

The compounds of formula I which possess more than one asymmetric center can occur in various diastereoisomeric forms. According to a further embodiment of the present process, mixtures of such diastereoisomers can be resolved according to known methods into the individual racemates which can, in turn, be separated into their optically active components in the manner described earlier.

The compounds of formula I are basic or also partially amphoteric and the preparation of their salts, especially those which are pharmaceutically acceptable, are also part of the invention. such salts can be prepared from the corresponding bases according to generally known methods by reaction with suitable inorganic or organic acids. Exemplary of organic and inorganic acids which can be used for the preparation of pharmaceutically acceptable salts are hydrochloric acid, hydrobromic acid, sulfuric acid, acetic acid, succinic acid, maleic acid, methanesulfonic acid, benzenesulfonic acid, p-toluene-sulfonic acid or the like. The non-pharmaceutically acceptable acid addition salts of the compounds of formula I are suitable as intermediates for the manufacture of corresponding pharmaceutically acceptable acid addition salts. The conversion of the non-pharmaceutically acceptable acid addition salts into the pharmaceutically acceptable acid addition salts can be carried out, for example, by double decomposition or by liberation of the base and subsequent salt formation with a suitable acid. Those compounds of formula I which possess amphoteric character can, if desired, also be converted into salts with suitable bases. Exemplary of such bases are the alkali metal hydroxides such as sodium hydroxide, potassium hydroxide, or the like.

The starting materials of formula II are, in part, novel compounds. They can be prepared, for example, by nitrating a compound of the formula

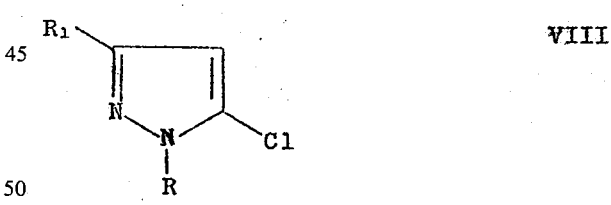

wherein
R and R₁ are as previously described, in the 4-position of the pyrazole ring with a nitrating acid in a known manner. The resulting 4-nitropyrazole compound of the formula

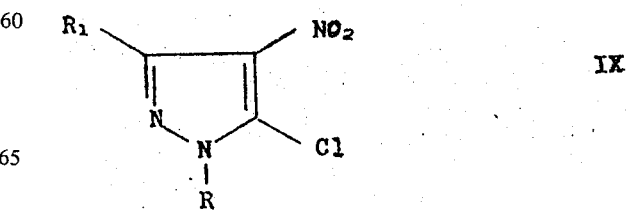

wherein

R and $R_1$ are as previously described, is heated with potassium cyanide in the presence of potassium iodide in an inert organic solvent, for example, dimethylformamide or a lower alkanol such as methanol or ethanol. A preferred temperature for this reaction is in the range of from about 50°C. to about the reflux temperature of the mixture. The pressure at which the reaction is carried out is not critical. The working-up is carried out by removal of the solvent and crystallization of the residue. The compounds of formula II prepared in this manner can be converted in a known manner to the compounds of formulae III, IV and V.

Compounds of formula III can be prepared, for example, by dissolving a compound of formula II in a lower alkanol such as methanol or ethanol and, after the addition of an inert base such as triethylamine, leaving the mixture to stand at room temperature. After completion of the reaction, the solvent is removed and the residue advantageously purified by chromatography.

The compounds of formula III thus obtained can be converted in a simple manner by treatment with ammonia, preferably in a closed vessel, at an elevated temperature, to the amidines of formula IV. A preferred temperature for this treatment is in the range of from about 80° to about 120°C. This treatment can also be carried out at a temperature above or below this range, but due to the possibility of decomposition of the reactants, the temperatures utilized should not be too high.

For the preparation of compounds of formula V, a compound of formula II is dissolved in an inert organic solvent, preferably in a mixture of pyridine and triethylamine, and an excess of hydrogen sulfide added to the mixture at room temperature. For the working-up, the reaction mixture is poured on to water and the reaction product is removed by filtration.

The compounds of formula I are used as medicaments. They are active on the central nervous system. In particular, they possess a psychosedative action of a particular type. For example, it has been found that they have no activity in the anti-pentamethylenetetrazole test but, on the other hand, they exhibit a strong activity in the mouse fighting test. In addition to this, they have an analgesic and muscle-relaxant activity. On the basis of the foregoing activity profile, the compounds of formula I are particularly suitable for use as tranquilizers in the treatment of psychomatic disorders.

Depending on the substitution, the acute toxicity of the compounds of formula I in mice varies between $DL_{50}$ 300 mg/kg. and $DL_{50}$ 5,000 mg/kg.

The psychosedative or tranquilizing activity of the compounds of formula I can be demonstrated, for example, utilizing the mouse fighting test described hereinafter.

At the beginning of the test, a compound of formula I which is to be tested is administered orally to 20 mice per compound and dosage. After a waiting time which is established for each experiment (as a rule 60 minutes), pairs of mice in grid containers are stimulated electrically via the grid. Fighting attacks are thereby induced. The number of fighting attacks during 3 minutes is registered When a pair of mice shows 3 or fewer fighting attacks in the observation period of 3 minutes, a protective action of the compound administered is assumed. Four or more fighting attacks are interpreted as a lack of a protective action. The dosage which protects half of the pairs of mice, that is, reduces the fighting attacks is denoted as the effective dosage 50 percent ($ED_{50}$). This is determined by graphical approximation by means of a dosage-activity curve.

The following Table shows the $ED_{50}$ values for representative compounds of formula I.

TABLE

| Compound | $ED_{50}$ mg/kg. p.c. |
| --- | --- |
| 1,3-dimethyl-4-nitropyrazole-5-carboxamidoxime | 1.0 |
| 1,3,0-trimethyl-4-nitropyrazole-5-carboxamidoxime | 1.3 |
| 0-propyl-1,3-dimethyl-4-nitro-pyrazole-5-carboxamidoxime | 6.6 |
| 0-acetyl-1,3-dimethyl-4-nitro-pyrazole-5-carboxamidoxime | 3.8 |
| 0-isonicotinoyl-1,3-dimethyl-4-nitro-pyrazole-5-carboxamidoxime | 8.0 |
| 0-ethoxycarbonyl-1,3-dimethyl-4-nitro-pyrazole-5-carboxamidoxime | 3.0 |
| 0-(3-chloropropionyl)-1,3-dimethyl-4-nitro-pyrazole-5-carboxamidoxime | 3.8 |
| 0-(1-methoxy-1-methylethyl)-1,3-dimethyl-4-nitro-pyrazole-5-carboxamidoxime | 3.8 |
| 1-propyl-3-methyl-4-nitro-pyrazole-5-carboxamidoxime | 1.8 |
| 1-methyl-4-nitro-pyrazole-5-carboxamidoxime | 7.2 |
| 3-(1,3-dimethyl-4-nitro-pyrazol-5-yl)-4,5-dihydro-5-methyl-1,2,4-oxadiazole | 9.3 |
| 0-isobutoxycarbonyl-1,3-dimethyl-4-nitro-pyrazole-5-carboxamidoxime | 8.9 |
| 0-(2-bromoethoxy)carbonyl-1,3-dimethyl-4-nitro-pyrazole-5-carboxamidoxime | 9.8 |
| 3-(1,3-dimethyl-4-nitro-pyrazol-5-yl)-4,5-dihydro-5,5-dimethyl-1,2,4-oxadiazole | 8.5 |
| 4,5-dihydro-5-methyl-3-(3-methyl-4-nitro-1-propylpyrazol-5-yl)-1,2,4-oxadiazole | 7.2 |

In the treatment of, for example, psychomatic disorders, the dosage of compounds of formula I will be adapted to the severity of the indications and other special requirements. In a preferred method, a compound of formula I is administered in the form of tablets, which can contain 1 mg., 5 mg. or 10 mg. of active ingredient, with repeated administrations in daily doses of 5 mg. to 20 mg., preferably 5 mg. to 10 mg.

The compounds of formula I and their pharmaceutically acceptable acid addition salts can be used as medicaments in the form of pharmaceutical preparations which contain them in association with a compatible pharmaceutical carrier. Such carrier can be an organic or inorganic inert carrier material which is suitable for enteral or parenteral administration, for example, water, gelatin, lactose, starches, magnesium stearate, talc, vegetable oils, gums, polyalkyleneglycols, or the like. The pharmaceutical preparations can be made up in solid form, for example, as tablets, dragees, suppositories or capsules, or in liquid form, for example, as solutions, suspensions or emulsions. They may be sterilized and/or may contain adjuvants such as preserving, stabilizing, wetting or emulsifying agents, salts for varying the osmotic pressure or buffers. They can also contain other therapeutically valuable substances.

EXAMPLE 1

Preparation of 1,3-dimethyl-4-nitropyrazole-5-carboxamidoxime 11.7 g. of hydroxylamine hydrochloride are dissolved in 80 ml. of absolute methanol and treated with a sodium methylate solution (prepared from 3.6 g. of sodium in 70 ml. of absolute methanol) at room temperature. The mixture is stirred for 15 minutes and the precipitated sodium chloride is removed by filtration. The hydroxylamine solution obtained is added dropwise with stirring over a period of 4 hours to a solution of 20 g. of 1,3-dimethyl-4-nitro-5-cyano-pyrazole in 120 ml. of absolute methanol maintained at 40°C., and the mixture is subsequently maintained for an additional 2 hours at 40°C. After distilling the solvent, the residue obtained is boiled with 200 ml. of absolute tetrahydrofuran. The undissolved portion is separated by removing the solvent by suction and, thereafter, removing the solvent by distillation. After recrystallization from ethanol, 1,3-dimethyl-4-nitropyrazole-5-carboxamidoxime is obtained in the form of yellowish crystals having a melting point of 186°–187°C. The hydrochloride crystallized from ethanol/ether forms white crystals having a melting point of > 213°C. (decomposition).

In an analogous manner to the foregoing procedure, from 1-propyl-3-methyl-4-nitro-5-cyano-pyrazole there is obtained 3-methyl-4-nitro-1-propylpyrazole-5-carboxamidoxime in the form of yellowish crystals, which after recrystallization from isopropyl ether/hexane has a melting point of 110°–111°C.

The 1-propyl-3-methyl-4-nitro-5-cyano-pyrazole starting material can be prepared as follows:

50 g. of 1-propyl-3-methyl-2-pyrazolin-5-one are treated with 100 ml. of phosphorus oxychloride and maintained in a bomb-tube for 12 hours at 130°C. The excess phosphorus oxychloride is removed by distillation in a water-jet vacuum. Thereafter, the residue is taken up in methylene chloride. The organic phase is washed once with a saturated sodium bicarbonate solution, dried over magnesium sulfate and the solvent is removed by distillation. The resulting 1-propyl-3-methyl-5-chloro-pyrazole boils at 72°–73°C/14 Torr and is immediately reacted further:

76.8 ml. of fuming nitric acid are added dropwise at 0°C. to a solution of 38 g. of 1-propyl-3-methyl-5-chloro-pyrazole in 100 ml. of concentrated sulfuric acid in such a manner that the temperature does not rise above 0°C. The mixture is stirred for an additional 4 hours at this temperature and thereafter poured on to 500 g. of ice. The reaction product is taken up in methylene chloride, dried over magnesium sulfate and the solvent is removed by distillation, whereby there are obtained 47.1 g. of 1-propyl-3-methyl-4-nitro-5-chloro-pyrazole, as a yellow oil which is uniform in the thin-layer chromatogram [Kieselgel plate; eluant: toluene-/ethyl acetate (9:1): development: UV light].

A mixture of 19.75 g. of 1-propyl-3-methyl-4-nitro-5-chloro-pyrazole, 125 ml. of dimethylformamide, 19.75 g. of potassium cyanide and 0.7 g. of potassium iodide is stirred for 4 hours at 120°C. Thereafter, the solvent is removed by distillation in a water-jet vacuum. The resulting residue is treated with water and extracted with methylene chloride. The organic phase is washed once with a saturated sodium chloride solution, dried over magnesium sulfate and the solvent is removed by distillation. The resulting 1-propyl-3-methyl-4-nitro-5-cyanopyrazole boils at 110°–112°C/0.04 Torr.

In an analogous manner to the procedure described in the first paragraph of this Example, from 1-methyl-4-nitro-5-cyanopyrazole there is obtained 1-methyl-4-nitropyrazole-5-carboxamidoxime as yellow crystals from ethanol having a melting point of 146°C.

The starting material can be prepared as follows: 24 g. of 1-methyl-2-pyrazolin-5-one are maintained in a bomb-tube for 16 hours at 130°–140°C. with 72 ml. of phosphorus oxychloride. After cooling, the excess phosphorus oxychloride is removed by distillation. The resulting residue is poured on to ice-water and the reaction product extracted with methylene chloride. The solvent dried over magnesium sulfate and distilled. The resulting 1-methyl-5-chloro-pyrazole boils at 65°C/51 Torr.

70 ml. of fuming nitric acid are added dropwise at 10°C. to a solution of 25 g. of 1-methyl-5-chloro-pyrazole in 89.5 ml. of concentrated sulfuric acid and the mixture is then stirred for an additional 4 hours at room temperature. The reaction mixture is poured on to ice-water and extracted with methylene chloride. The organic phase dried over sodium sulfate and the solvent is removed by distillation. The residue obtained crystallizes from ether/hexane to yield 1-methyl-4-nitro-5-chloro-pyrazole as yellow crystals having a melting point of 69°C.

A mixture of 38.3 g. of 1-methyl-4-nitro-5-chloropyrazole, 17 g. of potassium cyanide, 1.7 g. of potassium iodide and 300 ml. of dimethylformamide is stirred for 4 hours at 120°–130°C. After cooling, the solvent is removed by distillation. The residue is treated with water and extracted with methylene chloride. After drying over sodium sulfate, the solvent is removed by distillation and the residue obtained is treated with ethyl acetate. The precipitated white crystals are recrystallized from ethyl acetate to yield 1-methyl-4-nitro-5-cyano-pyrazole having a melting point of 102°C. is obtained.

In an analogous manner to the procedure described in the first paragraph of this Example, from 1-(2-hydroxyethyl)-3-methyl-4-nitro-cyano-pyrazole there is obtained 1-(2-hydroxyethyl)-3-methyl-4-nitropyrazole-5-carboxamidoxime as yellowish crystals having a melting point of 150°–151°C. after recrystallization from isopropyl alcohol.

The 1-(2-hydroxyethyl)-3-methyl-4-nitro-5-cyanopyrazole starting material can be prepared as follows:

60 g. of 5-methyl-4-nitro-isoxazole are dissolved in 1,500 ml. of toluene, treated with 35.6 g. of 2-hydroxyethyl-hydrazine and the mixture stirred overnight at room temperature. After distillation of the solvent, the mixture is dissolved in warm ethanol. The precipitated 1-hydroxyethyl-3-methyl-4-nitro-5-amino-pyrazole is recrystallized from acetonitrile as yellowish crystals having a melting point of 157°–158°C.

34.0 g. of 1-hydroxyethyl-3-methyl-4-nitro-5-amino-pyrazole are dissolved in a mixture of 50 ml. of concentrated hydrochloric acid, 250 ml. of glacial acetic acid and 150 ml. of water. Then, there is added dropwise to the solution with stirring at 15°C. a solution of 11.95 g. of sodium nitrite in 80 ml. of water. After completion of the addition, the diazonium salt solution is stirred for an additional 15 minutes. A mixture of 3.6 g. of copper, 10 g. of copper sulfate, 11 g. of sodium chloride, 30 ml. of concentrated hydrochloric acid and 20 ml. of water is maintained for 2 hours at reflux temperature. After cooling, the foregoing diazonium salt solution is added to this solution dropwise with stirring at room temperature, and the resulting mixture is stirred for 1 hour at 60°C. and subsequently overnight at room temperature. The reaction mixture is made alkaline by adding a sodium carbonate solution and is taken up in ethyl acetate. The organic phase is washed with sodium chloride solution, dried over magnesium sulfate and the solvent is distilled. The resulting dark-red oil crystallizes on standing. By recrystallization from ethyl acetate/petroleum ether there is obtained 1-hydroxyethyl-3-methyl-4-nitro-5-chloro-pyrazole as light-beige crystals having a melting point of 81°C.

20.0 g. of 1-hydroxyethyl-3-methyl-4-nitro-5-chloro-pyrazole are dissolved in 100 ml. of dimethylformamide and, after treatment with 7.0 g. of potassium cyanide and 0.7 g. of potassium iodide, the mixture is stirred for 15 hours at 40°C. After the solvent is removed by distillation, the residue is treated with water and taken up in methylene chloride. The organic phase is washed once with sodium chloride solution, dried over magnesium sulfate and the solvent is distilled. The oil obtained is purified on a 30-fold amount of Kieselgel. The fractions which are eluted with a toluene/ethyl acetate (8:2) solvent mixture and which are uniform in the thin-layer chromatogram are collected. The resulting 1-hydroxyethyl-3-methyl-4-nitro-5-cyano-pyrazole is obtained as beige crystals having a melting point of 73°–74°C. after recrystallization from isopropyl ether.

In an analogous manner to the procedure described in the first paragraph of this Example, from 1-vinyl-3-methyl-4-nitro-5-cyano-pyrazole there is obtained 1-vinyl-3-methyl-4-nitro-pyrazole-5-carboxamidoxime as yellowish crystals having a melting point of 185°–186°C.

The 1-vinyl-3-methyl-4-nitro-5-cyano-pyrazole starting material can be prepared as follows:

75 g. of 1-hydroxyethyl-3-methyl-5-hydroxy-pyrazole are treated with 300 ml. of phosphorus oxychloride and the mixture is maintained for 15 minutes at reflux temperature. After distilling the excess phosphorus oxychloride, the residue is treated with ice and shaken out with methylene chloride. The organic phase is washed successively with water, saturated sodium bicarbonate solution and water, dried over magnesium sulfate and the solvent is distilled. The resulting red-brown oil is distilled to yield 1-chloroethyl-3-methyl-5-chloro-pyrazole as a colorless liquid having a boiling point of 72°–75°C/8 Torr; $n_D^{20} = 1.5092$.

57.1 g. of 1-chloroethyl-3-methyl-5-chloro-pyrazole are added dropwise with stirring at 10°C. to 132 ml. of concentrated sulfuric acid. Thereafter, the mixture is cooled to 0°–5°C. and 153 ml. of fuming nitric acid are added dropwise at this temperature. The mixture is maintained at this temperature for 4 hours and stirred overnight at room temperature. It is then poured on to 1 kg. of ice and extracted twice with 1 liter of methylene chloride each time. The organic phase is washed with water, dried over magnesium sulfate and the solvent is distilled. The crystalline residue obtained is recrystallized from ethyl acetate/petroleum ether to yield 1-chloroethyl-3-methyl-4-nitro-5-chloro-pyrazole as beige crystals having a melting point of 68°–69°C.

60 g. of 1-chloroethyl-3-methyl-4-nitro-5-chloro-pyrazole are dissolved in 300 ml. of dimethylformamide and, after treatment with 17.4 g. of potassium cyanide and 1.8 g. of potassium iodide, the mixture is maintained for 4 hours at 120°C. Subsequently, the solvent is removed by distillation. After treatment with water, the mixture is taken up in methylene chloride. The organic phase is washed with water, dried over magnesium sulfate and the solvent is distilled. The residue obtained is chromatographed on a 30-fold amount of Kieselgel. The fractions eluted with toluene which are uniform on the thin-layer chromatogram are collected and the solvent is distilled. The resulting oil crystallizes on sprinkling with isopropyl ether to yield 1-vinyl-3-methyl-4-nitro-5-cyano-pyrazole as yellowish crystals having a melting point of 61°–62°C. from isopropyl ether.

EXAMPLE 2

Preparation of 1.3-dimethyl-4-nitropyrazole-5-carboxamidoxime

A solution of 9.9 g. of 1,3-dimethyl-4-nitropyrazole-5-carboxamidic acid methyl ester in 100 ml. of absolute methanol is stirred for 4 hours at an internal temperature of 40°C. with a solution of 1.7 g. of hydroxylamine in 70 ml. of absolute methanol. After removing the solvent by distillation, the residue obtained is recrystallized from ethanol to yield 1,3-dimethyl-4-nitropyrazole-5-carboxamidoxime having a melting point of 186°–187°C.

The starting material can be prepared as follows:

20.0 g. of 1,3-dimethyl-4-nitro-5-cyano-pyrazole are dissolved in 100 ml. of absolute methanol and after treatment with 2 ml. of triethylamine, the mixture is allowed to stand for 4 days at room temperature. After removing the solvent by distillation, the residue is chromatographed on a 30-fold amount of Kieselgel. The ethyl acetate eluates which are uniform in the thin-layer chromatogram (Kieselgel plate; eluant: methylene chloride/2 percent methanol; development: UV light) are collected. The white crystals of 1,3-dimethyl-4-nitropyrazole-5-carboximidic acid methyl ester obtained after the solvent is removed by distillation have a melting point of 92°–93°C. after recrystallization from ethyl acetate/petroleum ether (low boiling).

EXAMPLE 3

Preparation of 1,3-dimethyl-4-nitropyrazole-5-carboxamidoxime 0.904 g. of hydroxylamine hydrochloride are dissolved in 20 ml. of absolute methanol. The solution is treated with 0.648 g. of sodium methylate, stirred for 15 minutes, the precipitated sodium chloride is removed by filtration. The filtrate is added dropwise to a solution of 1.83 g. of 1,3-dimethyl-4-nitropyrazole-5-carboxamidine at 40°C. and the mixture subsequently maintained for 20 hours at reflux temperature. After the methanol is removed by distillation, the residue obtained is chromatographed on a 30-fold amount of Kieselgel. The ethyl acetate eluates which are uniform in the thin-layer chromatogram (Kieselgel; eluant: ether; development: UV light), are collected and the solvent is removed by distillation. After recrystallization from alcohol, there are obtained yellowish crystals of 1,3-dimethyl-4-nitropyrazole-5-carboxamidoxime having a melting point of 186°–187°C.

The starting material can be prepared as follows:

2.5 g. of 1,3-dimethyl-4-nitropyrazole-5-carboximidic acid methyl ester are treated with 20 ml. of a saturated solution of ammonia in methanol and maintained in a bomb-tube overnight at 110°C. After removing the solvent by distillation, the residue is dissolved in hot ethyl acetate, treated with activated charcoal and, after concentration to a small volume, left to stand. The crystals obtained are recrystallized from ethyl acetate to yield 1,3-dimethyl-4-dimethyl-4-nitropyrazole-5-carboxamidine as light yellow crystals having a melting point of 148°–150°C.

EXAMPLE 4

Preparation of 1,3,O-trimethyl-4-nitropyrazole-5-carboxamidoxime

A solution of 3.3 g. of 1,3-dimethyl-4-nitropyrazole-5-carboxamidoxime in 150 ml. of absolute alcohol is treated with a sodium ethylate solution (prepared from 0.383 g. of sodium in 20 ml. of absolute ethanol). The mixture is stirred for 5 minutes at room temperature, and a solution of 2.83 g. of methyl iodide in 20 ml. of ethanol is added dropwise thereto at 15°C. The resulting mixture is subsequently maintained for 2 hours at reflux temperature. After removing the solvent by distillation, the product obtained is rapidly purified on a 10-fold amount of Kieselgel. The 1,3,0-trimethyl-4-nitropyrazole-5-carboxamidoxime formed is eluted with chloroform. From ethyl acetate/hexane, there is obtained 1,3,0-trimethyl-4-nitropyrazole-5-carboxamidoxime as yellow crystals having a melting point of 115°–116°C.

In an analogous manner there can be prepared:
O-Ethyl-1,3-dimethyl-4-nitropyrazole-5-carboxamidoxime as lemon-yellow crystals from cyclohexane, having a melting point of 93°–94°C.
O-Propyl-1,3-dimethyl-4-nitropyrazole-5-carboxamidoxime as a yellow oil. Mass spectrum: peaks (M/e) at 241, 224, 222, 182, 181, 151, 136.

EXAMPLE 5

Preparation of O-(1-methoxy-1-methylethyl)-1,3-dimethyl-4-nitropyrazole-5-carboxamidoxime A mixture of 5 g. of 1,3-dimethyl-4-nitro-pyrazole-5-carboxamidoxime and 100 ml. of acetone dimethyl acetal is maintained for 36 hours at reflux temperature. After distilling off the excess solvent, the residue obtained is chromatographed on 350 g. of Kieselgel. The chromatographically uniform methylene chloride/5 percent methanol eluates are collected, the solvent distilled off and the crystalline residue obtained recrystallized from ether/hexane. There are obtained white crystals of O-(1-methoxy-1-methylethyl)-1,3-dimethyl-4-nitropyrazole-5-carboxamidoxime of melting point of 131°C.

EXAMPLE 6

Preparation of O-acetyl-1,3-dimethyl-4-nitropyrazole-5-carboxamidoxime

A solution of 4.0 g. of acetyl chloride in 20 ml. of ether is added dropwise with stirring at room temperature to a solution of 9.9 g. of 1,3-dimethyl-4-nitropyrazole-5-carboxamidoxime in 80 ml. of pyridine. The mixture is subsequently stirred for an additional 2 hours. After the solvent is removed by distillation in a water-jet vacuum, the yellow oil obtained is treated with water and shaken out with ethyl acetate. The organic phase is washed with ice-cold sodium carbonate solution and subsequently with saturated sodium chloride solution, dried over magnesium sulfate and the solvent is distilled off. The crystalline residue obtained is recrystallized from ethyl acetate/hexane to yield O-acetyl-1,3-dimethyl-4-nitropyrazole-5-carboxamidoxime as white crystals having a melting point of 174°C.

In an analogous manner there can be prepared:
O-Propionyl-1,3-dimethyl-4-nitropyrazole-5-carboxamidoxime, white crystals from ethyl acetate/hexane, having a melting point of 183°–184°C.
O-Butyryl-1,3-dimethyl-4-nitropyrazole-5-carboxamidoxime, white crystals from ethanol, having a melting point of 155°–157°C.
O-Benzoyl-1,3-dimethyl-4-nitropyrazole-5-carboxamidoxime, white crystals from ethanol, having a melting point of 166°–168°C.
O-Nicotinoyl-1,3-dimethyl-4-nitropyrazole-5-carboxamidoxime white crystals from ethanol, having a melting point of 206°–208°C.
O-Cinnamoyl-1,3-dimethyl-4-nitropyrazole-5-carboxamidoxime, white crystals from ethanol, having a melting point of 171°–173°C.
O-Phenylacetyl-1,3-dimethyl-4-nitropyrazole-5-carboxamidoxime, white crystals from ethanol, having a melting point of 138°–139°C.
O-Hydrocinnamoyl-1,3-dimethyl-4-nitropyrazole-5-carboxamidoxime, white crystals from ethanol, having a melting point of 148°–149°C.
O-Cyclohexylcarbonyl-1,3-dimethyl-4-nitropyrazole-5-carboxamidoxime, white crystals from isopropyl ether, having a melting point of 173°–174°C.
O-(3-chloropropionyl)-1,3-dimethyl-4-nitropyrazole-5-carboxamidoxime, white crystals from ethanol/hexane, having a melting point of 110°–112°C.
O-Isonicotinoyl-1,3-dimethyl-4-nitropyrazole-5-carboxamidoxime, white crystals from ethanol, having a melting point of 173°–174°C.
O-(p-Chlorobenzoyl)-1,3-dimethyl-4-nitropyrazole-5-carboxamidoxime, white crystals from ethanol, having a melting point of 181°–182°C.
O-(3,4,5-Trimethoxybenzoyl)-1,3-dimethyl-4-nitropyrazole-5-carboxamidoxime, white crystals from ethanol, having a melting point of 198°–200°C.

Starting from 1-methyl-4-nitropyrazole-5-carboxamidoxime there is obtained O-isonicotinoyl-1-methyl-4-nitropyrazole-5-carboxamidoxime, white crystals from acetonitrile, having a melting point of 204°–205°C.

EXAMPLE 7

Preparation of O-ethoxycarbonyl-1,3-dimethyl-4-nitropyrazole-5-carboxamidoxime 9.9 g. of 1,3-dimethyl-4-nitropyrazole-5-carboxamidoxime are dissolved in a mixture of 150 ml. of absolute tetrahydrofuran and 4.4 ml. of pyridine and the mixture is cooled to 0°C. A solution of 5.4 g. of chloroformic acid ethyl ester in 15 ml. of absolute tetrahydrofuran is added dropwise with stirring at this temperature and the mixture is stirred for an additional 2 hours. The mixture is poured on to 500 ml. of ice-water and shaken out with methylene chloride. The organic phase is washed with water, dried over sodium sulfate and the solvent is removed by distillation. The crystals obtained are recrystallized from tetrahydrofuran to yield O-ethoxycarbonyl-1,3-dimethyl-4-nitropyrazole-5-carboxamidoxime as white crystals having a melting point of 212°C.

In an analogous manner there can be prepared:
O-Butoxycarbonyl-1,3-dimethyl-4-nitropyrazole-5-carboxamidoxime, white crystals from tetrahydrofuran/hexane, having a melting point of 133°–134°C.

O-Isopropoxycarbonyl-1,3-dimethyl-4-nitropyrazole-5-carboxamidoxime, white crystals from tetrahydrofuran, having a melting point of 199°–201°C.

O-Isobutoxycarbonyl-1,3-dimethyl-4-nitropyrazole-5-carboxamidoxime, white crystals from tetrahydrofuran, having a melting point of 139°–141°C.

O-(2-Bromoethoxy)carbonyl-1,3-dimethyl-1,3-dimethyl-4-nitropyrazole-5-carboxamidoxime, white crystals from tetrahydrofuran/hexane, having a melting point of 164°–165°C.

O-Allyloxycarbonyl-1,3-dimethyl-4-nitropyrazole-5-carboxamidoxime, white crystals from tetrahydrofuran, having a melting point of 158°–160°C.

In an analogous manner, starting from 1-methyl-4-nitropyrazole-5-carboxamidoxime there is obtained O-ethoxycarbonyl-1-methyl-4-nitropyrazole-5-carboxamidoxime, white crystals from tetrahydrofuran, having a melting point of 154°–155°C.

EXAMPLE 8

Preparation of 3-(1,3-dimethyl-4-nitropyrazol-5-yl)-4,5-dihydro-5-methyl-1,2,4-oxadiazole 44 g. of acetaldehyde are added dropwise with stirring to a suspension of 19.9 g. of 1,3-dimethyl-4-nitropyrazole-5-carboxamidoxime in 1,000 ml. of ethanol maintained at 5°C, the temperature rising to 20°C. and amidoxime passing into solution. After the mixture has been stirred for an additional 1 hour at room temperature, the mixture is maintained overnight at reflux. Thereafter, the solvent is removed by distillation and the residue obtained chromatographed on 350 g. of Kieselgel. The uniform methylene chloride/5 percent methanol eluates are collected. The solvent was removed by distillation and the crystals obtained recrystallized from ethyl acetate/hexane to yield 3-(1,3-dimethyl-4-nitropyrazol-5-yl)-4,5-dihydro-5-methyl-1,2,4-oxadiazole as yellow crystals having a melting point of 100°C.

In an analogous manner there can be prepared:

3-(1,3-dimethyl-4-nitropyrazol-5-yl)-4,5-dihydro-5-propyl-1,2,4-oxadiazole, yellow crystals having a melting point of 86°C.

4,5-dihydro-5-methyl-3-(3-methyl-4-nitro-2-propylpyrazol-5-yl)-1,2,4-oxadiazole, yellow crystals from hexane, having a melting point of 67°–68°C.

3-(3-methyl-4-nitropyrazol-5-yl)-4,5-dihydro-5-methyl-1,2,4-oxadiazole, yellow crystals from methylene chloride/hexane, having a melting point of 84°C.

EXAMPLE 9

Preparation of 3-(1,3-dimethyl-4-nitropyrazole-5-yl)-4,5-dihydro-5-phenyl-1,2,4-oxadiazole A mixture of 2 g. of 1,3-dimethyl-4-nitropyrazole-5-carboxamidoxime and 11 g. of benzaldehyde is maintained overnight at an oil-bath temperature of 110°C. After cooling, the mixture obtained is purified on 500 g. of Kieselgel. The uniform eluates obtained with chloroform are collected. Thereafter, the solvent is removed by distillation and the crystalline residue obtained is recrystallized from ethyl acetate to yield 3-(1,3-dimethyl-4-nitropyrazol-5-yl)-4,5-dihydro-5-phenyl-1,2,4-oxadiazole as yellow crystals having a melting point of 119°–120°C.

EXAMPLE 10

Preparation of 3-(1,3-dimethyl-4-nitropyrazol-5-yl)-1-oxa-2,4-diazaspiro[4,5]dec-2-ene A mixture of 16.0 g. of 1,3-dimethyl-4-nitropyrazole-5-carboxamidoxime and 50 ml. of cyclohexanone is stirred for 12 hours in an oil-bath at a temperature of 100°C. The excess cyclohexanone is subsequently distilled under a high vacuum. The yellow residue obtained is chromatographed on a 30-fold amount of Kieselgel. The uniform methylene chloride/2 percent methanol eluates are collected. The solvent is distilled and the crystalline residue obtained recrystallized from methylene chloride/hexane to yield 3-(1,3-dimethyl-4-nitropyrazol-5-yl)-1-oxa-2,4-diazaspiro[4,5]dec-2-ene as yellow crystals having a melting point of 169°–170°C.

EXAMPLE 11

Preparation of 3-(1,3-dimethyl-4-nitropyrazol-5-yl)-4,5-dihydro-5,5-dimethyl-1,2,4-oxadiazole 5.0 g. of 1,3-dimethyl-4-nitropyrazole-5-carboxamidoxime are treated with 50 ml. of acetone and the mixture is maintained for 24 hours in a bomb-tube at 100°C. After the excess solvent is removed by distillation, the residue obtained is treated with 70 ml. of methylene chloride. The mixture is boiled for a short time and freed from the insoluble portion by filtration. After distilling the solvent, the residue obtained is chromatographed on a 30-fold amount of Kieselgel. The fractions which are eluted with methylene chloride/5 percent methanol and which are uniform in the thin-layer chromatogram, are combined, the solvent distilled off and the residue obtained recrystallized from ethyl acetate/hexane. There are obtained yellow crystals of 3-(1,3-dimethyl-4-nitropyrazol-5-yl)-4,5-dihydro-5,5-dimethyl-1,2,4-oxadiazole of melting point 131°–132°C.

EXAMPLE 12

Preparation of O-methoxymethyl-1,3-dimethyl-4-nitropyrazole-5-carboxamidoxime 5 g. of 1,3-dimethyl-4-nitropyrazole-5-carboxamidoxime are dissolved in 50 ml. of absolute dimethylformamide, the mixture is cooled to −40°C. and 2.03 g. of sodium methylate are added at this temperature. After stirring for 15 minutes at this temperature, 3.0 ml. of chlorodimethyl ether are added dropwise. After 0.5 hour, the mixture is poured on to ice-water and shaken out with chloroform. The organic phase is washed once with water, dried over magnesium sulfate and the solvent is distilled. The oil obtained is chromatographed on a 30-fold amount of Kieselgel (granule size 0.05–0.02 mm.) using toluene/ethyl acetate (9:1) as the eluting agent. The fractions obtained are combined and evaporated. The residual oil is crystallized from n-hexane and thereafter recrystallized from ethyl acetate/petroleum ether (40°–45°C.) to yield O-methoxy-methyl-1,3-dimethyl-4-nitropyrazole-5-carboxamidoxime as light-yellow crystals having a melting point of 107°–108°C.

The following Examples illustrate typical pharmaceutical preparations containing the pyrazole derivatives of the invention:

EXAMPLE 13

Preparation of capsules:

A compound of formula I (hereinafter referred to as "active ingredient") can be incorporated in capsules having the following composition:

|   |   |
|---|---|
| active ingredient | 10 mg. |
| lactose | 155 mg. |
| corn starch | 40 mg. |
| talc | 5 mg. |
| Total | 210 mg. |

The active ingredient is mixed with the lactose and the corn starch in a suitable mixer. The resulting mixture is then passed through a comminuting machine and returned to the mixer where the talc is added. After good intermixing, the mixture is filled into gelatin capsules of size No. 4.

EXAMPLE 14

Preparation of tablets:

A compound of formula I (hereinafter referred to as "active ingredient") can be incorporated in tablets having the following composition:

|   |   |
|---|---|
| active ingredient | 5.0 mg. |
| lactose | 100.0 mg. |
| corn starch | 3.0 mg. |
| calcium stearate | 2.0 mg. |
| Total | 110.0 mg. |

The active ingredient and the remaining ingredients are mixed well. The mixture is compressed on a tabletting machine to slugs of about 2.5 cm. diameter and 0.8 cm. thickness which are then comminuted to a granulate (about 1.2 mm.). The granulate so obtained is compressed to 110 mg. tablets.

EXAMPLE 15

Preparation of dragees:

The compounds of formula I (hereinafter referred to as "active ingredient") can be incorporated in dragees having the following compositions:

|   |   |
|---|---|
| Core: | |
| active ingredient | 2 mg. |
| mannitol | 88 mg. |
| talc | 5 mg. |
| corn starch | 15 mg. |
| core weight | 110 mg. |
| Coating mass: | |
| sugar 90 percent | |
| rice starch 5 percent | 150 mg. |
| talc 5 percent | |
| core weight | 110 mg. |
| dragee weight | 150 mg. |
|   | 260 mg. |

The active ingredient is mixed with the mannitol and passed through a No. 5 sieve (mesh width about 0.23 mm.). The corn starch is boiled with water to give a 10 percent paste. The powdery mixture is homogeneously triturated with the corn starch paste. The slightly moist mass is granulated by means of a No. 3 sieve (mesh width about 1.0 mm.). The material for compression is compressed to biconvex cores of 150 mg. weight. The cores have a diameter of approximately 8.0 mm.

The resulting cores are coated with sugar according to the usual coating process utilizing sugar syrup up to final weight of 300 mg.

We claim:

1. A compound of the formula

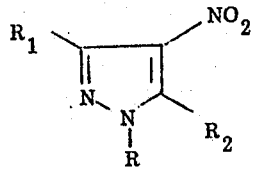

wherein
R is lower alkyl, halo-lower alkyl, hydroxy-lower alkyl, lower alkoxy-lower alkyl, lower alkoxycarbonyl-lower alkyl, carboxy-lower alkyl or lower alkenyl; $R_1$ is hydrogen, halogen, lower alkyl or lower alkoxy and $R_2$ is a radical of the formula

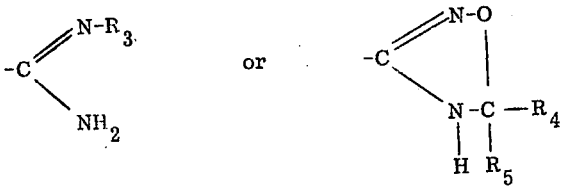

wherein
$R_3$ is lower alkanoyloxy, lower alkoxycarbonyloxy, phenylcarbonyloxy, lower alkyl-phenylcarbonyloxy, lower alkoxy-phenylcarbonyloxy, halo-phenylcarbonyloxy, phenyl-(lower alkylcarbonyloxy), lower alkyl-phenyl-(lower alkyl-carbonyloxy), lower alkoxy-phenyl-(lower alkylcarbonyloxy), halo-phenyl-(lower alkylcarbonyloxy), phenyl-(lower alkenyl-carbonyloxy), lower alkyl-phenyl-(lower alkenyl-carbonyloxy), lower alkoxy-phenyl-(lower alkenyl-carbonyloxy), halo-phenyl- (lower alkenylcarbonyloxy), pyridyl-(lower alkylcarbonyloxy), lower alkyl-pyridyl-(lower alkylcarbonyloxy), lower alkoxy-pyridyl-(lower alkylcarbonyloxy), halo-pyridyl-(lower alkyl-carbonyloxy), pyridyl-carbonyloxy, lower alkyl-pyridylcarbonyloxy, lower alkoxy-pyridylcarbonyloxy or halo-pyridylcarbonyloxy; $R_4$ is lower alkyl or phenyl; and $R_5$ is hydrogen or lower alkyl or $R_4$ and $R_5$, taken together with the carbon to which they are attached, are a 5-, 6- or 7-membered alicyclic ring, or a pharmaceutically acceptable acid addition salt thereof.

2. A compound in accordance with claim 1, wherein $R_2$ is a radical of the formula

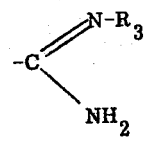

wherein
$R_3$ is as previously described.

3. A compound in accordance with claim 2, wherein R is lower alkyl and $R_1$ is hydrogen or lower alkyl.

4. A compound in accordance with claim 3, wherein $R_1$ is hydrogen.

5. A compound in accordance with claim 3, wherein $R_1$ is lower alkyl.

6. A compound in accordance with claim 1, wherein $R_2$ is a radical of the formula

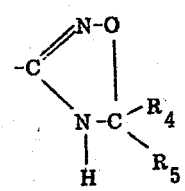

wherein
$R_4$ and $R_5$ are as previously described.

7. A compound in accordance with claim 6, wherein R is lower alkyl and $R_1$ is hydrogen or lower alkyl.

8. A compound in accordance with claim 7, wherein $R_1$ is hydrogen.

9. A compound in accordance with claim 7, wherein $R_1$ is lower alkyl.

10. A compound in accordance with claim 7, wherein $R_4$ is lower alkyl and $R_5$ is hydrogen.

11. A compound in accordance with claim 7, wherein $R_4$ and $R_5$ are lower alkyl.

12. A compound in accordance with claim 7, wherein $R_4$ is phenyl and $R_5$ is hydrogen.

13. A compound in accordance with claim 2, O-acetyl-1,3-dimethyl-4-nitropyrazole-5-carboxamidoxime.

14. A compound in accordance with claim 2, O-propionyl-1,3-dimethyl-4-nitropyrazole-5-carboxamidoxime.

15. A compound in accordance with claim 2, O-butyryl-1,3-dimethyl-4-nitropyrazole-5-carboxamidoxime.

16. A compound in accordance with claim 2, O-benzoyl-1,3-dimethyl-4-nitropyrazole-5-carboxamidoxime.

17. A compound in accordance with claim 2, O-nicotinoyl-1,3-dimethyl-4-nitropyrazole-5-carboxamidoxime.

18. A compound in accordance with claim 2, O-cinnamoyl-1,3-dimethyl-4-nitropyrazole-5-carboxamidoxime.

19. A compound in accordance with claim 2, O-phenylacetyl-1,3-dimethyl-4-nitropyrazole-5-carboxamidoxime.

20. A compound in accordance with claim 2, O-hydrocinnamoly-1,3-dimethyl-4-nitropyrazole-5-carboxamidoxime.

21. A compound in accordance with claim 2, O-cyclohexylcarbonyl-1,3-dimethyl-4-nitropyrazole-5-carboxamidoxime.

22. A compound in accordance with claim 2, O-ethoxycarbonyl-1,3-dimethyl-4-nitropyrazole-5-carboxamidoxime.

23. A compound in accordance with claim 2, O-acetyl-1-methyl-4-nitropyrazole-5-carboxamidoxime.

24. A compound in accordance with claim 2, O-ethoxycarbonyl-1-methyl-4-nitropyrazole-5-carboxamidoxime.

25. A compound in accordance with claim 2, O-butoxycarbonyl-1,3-dimethyl-4-nitropyrazole-5-carboxamidoxime.

26. A compound in accordance with claim 2, O-isopropoxycarbonyl-1,3-dimethyl-4-nitropyrazole-5-carboxamidoxime.

27. A compound in accordance with claim 2, O-isobutoxycarbonyl-1,3-dimethyl-4-nitropyrazole-5-carboxamidoxime.

28. A compound in accordance with claim 2, O-(2-bromoethoxy)carbonyl-1,3-dimethyl-4-nitropyrazole-5-carboxamidoxime.

29. A compound in accordance with claim 2, O-allyloxycarbonyl-1,3-dimethyl-4-nitropyrazole-5-carboxamidoxime.

30. A compound in accordance with claim 2, O-(3-chloropropionyl)-1,3-dimethyl-4-nitropyrazole-5-carboxamidoxime.

31. A compound in accordance with claim 2, O-isonicotinoyl-1,3-dimethyl-4-nitropyrazole-5-carboxamidoxime.

32. A compound in accordance with claim 2, O-(p-chlorobenzoly)-1,3-dimethyl-4-nitropyrazole-5-carboxamidoxime.

33. A compound in accordance with claim 2, O-(3,4,5-trimethoxybenzoyl)-1,3-dimethyl-4-nitropyrazole-5-carboxamidioxime.

34. A compound in accordance with claim 2, O-isonicotinoyl-1-methyl-4-nitropyrazole-5-carboxamidoxime.

35. A compound in accordance with claim 6, 3-(1,3-dimethyl-4-nitropyrazol-5-yl)-4,5-dihydro-5-methyl-1,2,4-oxadiazole.

36. A compound in accordance with claim 6, 3-(1,3-dimethyl-4-nitropyrazol-5-yl)-4,5-dihydro-5-propyl-1,2,4-oxadiazole.

37. A compound in accordance with claim 6, 3-(1,3-dimethyl-4-nitropyrazol-5-yl)-4,5-dihydro-5-phenyl-1,2,4-oxadiazole.

38. A compound in accordance with claim 6, 3-(1,3-dimethyl-4-nitropyrazol-5-yl)-1-oxa-2,4-diazaspiro[4,5]dec-2-ene.

39. A compound in accordance with claim 6, 3-(1,3-dimethyl-4-nitropyrazol-5-dihydro-5,5-dimethyl-1,2,4-oxadiazole.

40. A compound in accordance with claim 6, 4,5-dihydro-5-methyl-3-(3-methyl-4-nitro-1-propylpyrazol-5-yl)-1,2,4-oxadiazole.

41. A compound in accordance with claim 6, 3-(1-methyl-4-nitropyrazol-5-yl)-4,5-dihydro-5-methyl-1,2,4-oxadiazole.

42. A compound in accordance with claim 6, 3-(1-methyl-4-nitropyrazol-5-yl)-4,5-dihydro-5-phenyl-1,2,4-oxadiazole.

\* \* \* \* \*

UNITED STATES PATENT OFFICE
CERTIFICATE OF CORRECTION

PATENT NO. : 3,887,548
DATED : June 3, 1975
INVENTOR(S) : HANS BRUDERER & ROLF RICHLE It is certified that error appears in the above-identified patent and that said Letters Patent are hereby corrected as shown below:

Column 21, claim 20, line 35, "hydrocinnamoly" should be:

hydrocinnamoyl

Column 22, claim 32, line 19 "chlorobenzoly" should be:

chlorobenzoyl

Column 22, claim 39, lines 41 & 42, "dimethyl-4-nitropyrazol-5-dihydro-5,5-dimethyl-1,2,4-oxadiazole." should be:

dimethyl-4-nitropyrazol-5-yl)-4,5-dihydro-5,5-dimethyl-1,2,4-oxadiazole

Signed and Sealed this second Day of December 1975

[SEAL]

Attest:

RUTH C. MASON
Attesting Officer

C. MARSHALL DANN
Commissioner of Patents and Trademarks